(12) United States Patent
Duvall et al.

(10) Patent No.: US 10,145,573 B2
(45) Date of Patent: Dec. 4, 2018

(54) HUMIDIFYING APPARATUS

(71) Applicant: Dyson Technology Limited, Wiltshire (GB)

(72) Inventors: Thomas Greer Duvall, Bristol (GB); Daniel George Cowen, Bristol (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 15/203,355

(22) Filed: Jul. 6, 2016

(65) Prior Publication Data

US 2017/0010011 A1 Jan. 12, 2017

(30) Foreign Application Priority Data

Jul. 7, 2015 (GB) .................................. 1511899.5

(51) Int. Cl.
| | |
|---|---|
| *F24F 6/00* | (2006.01) |
| *B01F 3/04* | (2006.01) |
| *F24F 6/14* | (2006.01) |
| *F24F 3/14* | (2006.01) |
| *F24F 6/12* | (2006.01) |

(Continued)

(52) U.S. Cl.
CPC .............. *F24F 6/14* (2013.01); *B01F 3/0407* (2013.01); *C02F 1/325* (2013.01); *F24F 3/14* (2013.01); *F24F 6/00* (2013.01); *F24F 6/12* (2013.01); *C02F 2303/04* (2013.01); *F24F 3/16* (2013.01); *F24F 2006/006* (2013.01); *F24F 2006/008* (2013.01); *F24F 2006/143* (2013.01); *Y02B 30/545* (2013.01)

(58) Field of Classification Search
CPC ....... F24F 3/14; F24F 6/00; B01F 3/04; B01F 3/0407

USPC ................................ 261/37, 38, 66, 70, 72.1
See application file for complete search history.

(56) References Cited

U.S. PATENT DOCUMENTS

| | | | |
|---|---|---|---|
| 5,859,952 | A | 1/1999 | Levine et al. |
| 6,588,421 | B1 | 7/2003 | Diehl et al. |
| 6,691,702 | B2 | 2/2004 | Appel et al. |

(Continued)

FOREIGN PATENT DOCUMENTS

| | | |
|---|---|---|
| CN | 203274114 | 11/2013 |
| GB | 2500011 | 9/2013 |

(Continued)

OTHER PUBLICATIONS

Search Report dated Dec. 30, 2015, directed to GB Application No. 1511899.5; 2 pages.

(Continued)

*Primary Examiner* — Robert A Hopkins
(74) *Attorney, Agent, or Firm* — Morrison & Foerster LLP

(57) ABSTRACT

A humidifying apparatus comprising a base comprising a chamber, a water tank removably mounted on the base for supplying water to the chamber, an impeller and a motor for driving the impeller to generate an air flow, an inlet duct for conveying the air flow to the chamber, humidifying means for humidifying the air flow with water from the chamber; and an outlet duct for conveying the humidified air flow from the chamber, wherein a lower internal surface of the water tank comprises a raised portion and a feeder trough, which is lower than the raised portion when the water tank is mounted on the base.

9 Claims, 17 Drawing Sheets

(51) Int. Cl.
*C02F 1/32* (2006.01)
*F24F 3/16* (2006.01)

(56) References Cited

U.S. PATENT DOCUMENTS

| | | | |
|---|---|---|---|
| 6,780,227 B2 | 8/2004 | DuBose et al. | |
| 7,540,474 B1 | 6/2009 | Huang et al. | |
| 7,909,032 B2 | 3/2011 | Feldhahn et al. | |
| 7,926,791 B1 | 4/2011 | Bertoli | |
| 8,231,112 B2 | 7/2012 | Cao et al. | |
| 8,678,355 B2 | 3/2014 | Steg et al. | |
| 8,740,002 B2 | 6/2014 | Ripberger, Jr. et al. | |
| 9,360,227 B2 * | 6/2016 | Barker | F24F 6/00 |
| 2011/0017212 A1 | 1/2011 | Kenyon et al. | |
| 2013/0249126 A1 | 9/2013 | Staniforth et al. | |
| 2014/0210114 A1 * | 7/2014 | Staniforth | F04D 25/08 261/30 |
| 2017/0008679 A1 | 1/2017 | Duvall et al. | |
| 2017/0010010 A1 | 1/2017 | Duvall et al. | |

FOREIGN PATENT DOCUMENTS

| | | |
|---|---|---|
| GB | 2510195 | 7/2014 |
| JP | 56-14925 | 2/1981 |
| JP | 2-106527 | 8/1990 |
| JP | 5-42944 | 6/1993 |
| JP | 10-132272 | 5/1998 |
| JP | 2003-156236 | 5/2003 |
| JP | 2008-281225 | 11/2008 |
| JP | 2009-275925 | 11/2009 |
| JP | 2010-7884 | 1/2010 |
| JP | 2010-38413 | 2/2010 |
| JP | 4726760 | 7/2011 |
| JP | 2012-145238 | 8/2012 |
| JP | 2014-62686 | 4/2014 |
| JP | 2015-72120 | 4/2015 |
| WO | WO-2008/018696 | 2/2008 |
| WO | WO-2013/132222 | 9/2013 |

OTHER PUBLICATIONS

International Search Report and Written Opinion dated Oct. 11, 2016, directed to International Application No. PCT/GB2016/051961; 9 pages.

Duvall et al., U.S. Office Action dated Oct. 6, 2017, directed to U.S. Appl. No. 15/203,207; 7 pages.

Duvall et al., U.S. Office Action dated Apr. 3, 2018, directed to U.S. Appl. No. 15/203,207; 8 pages.

* cited by examiner

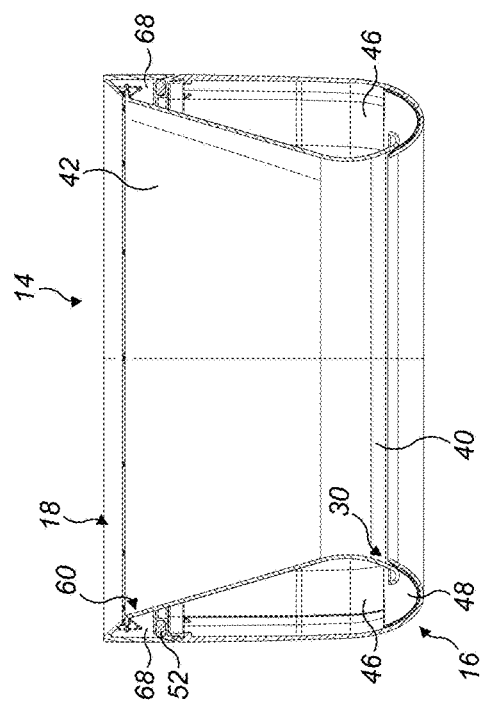
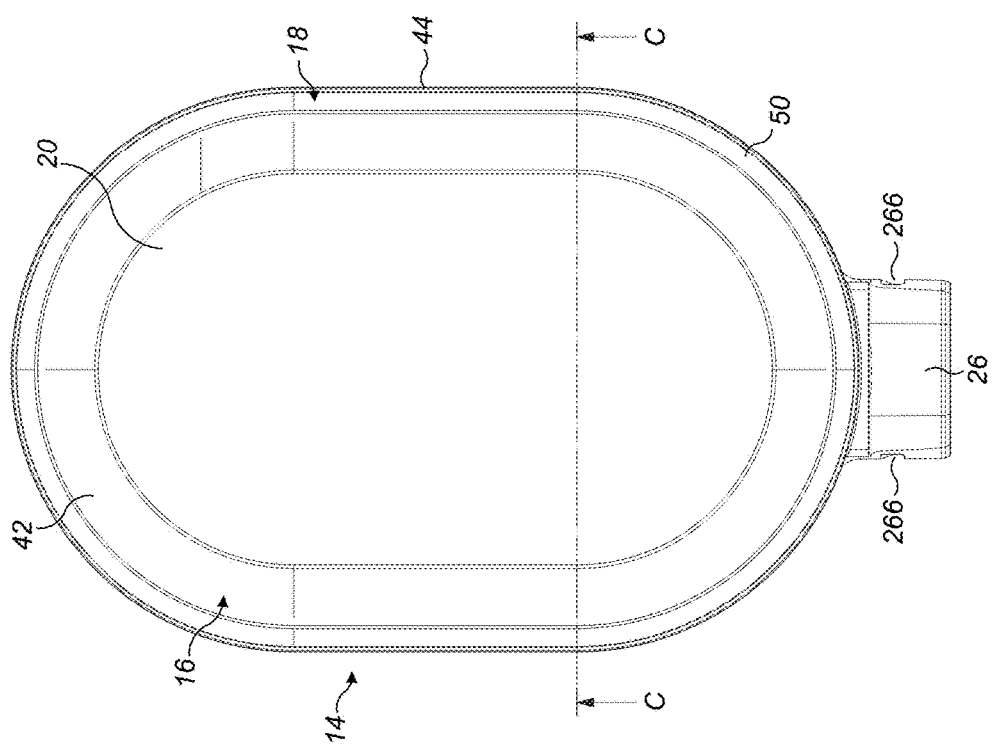

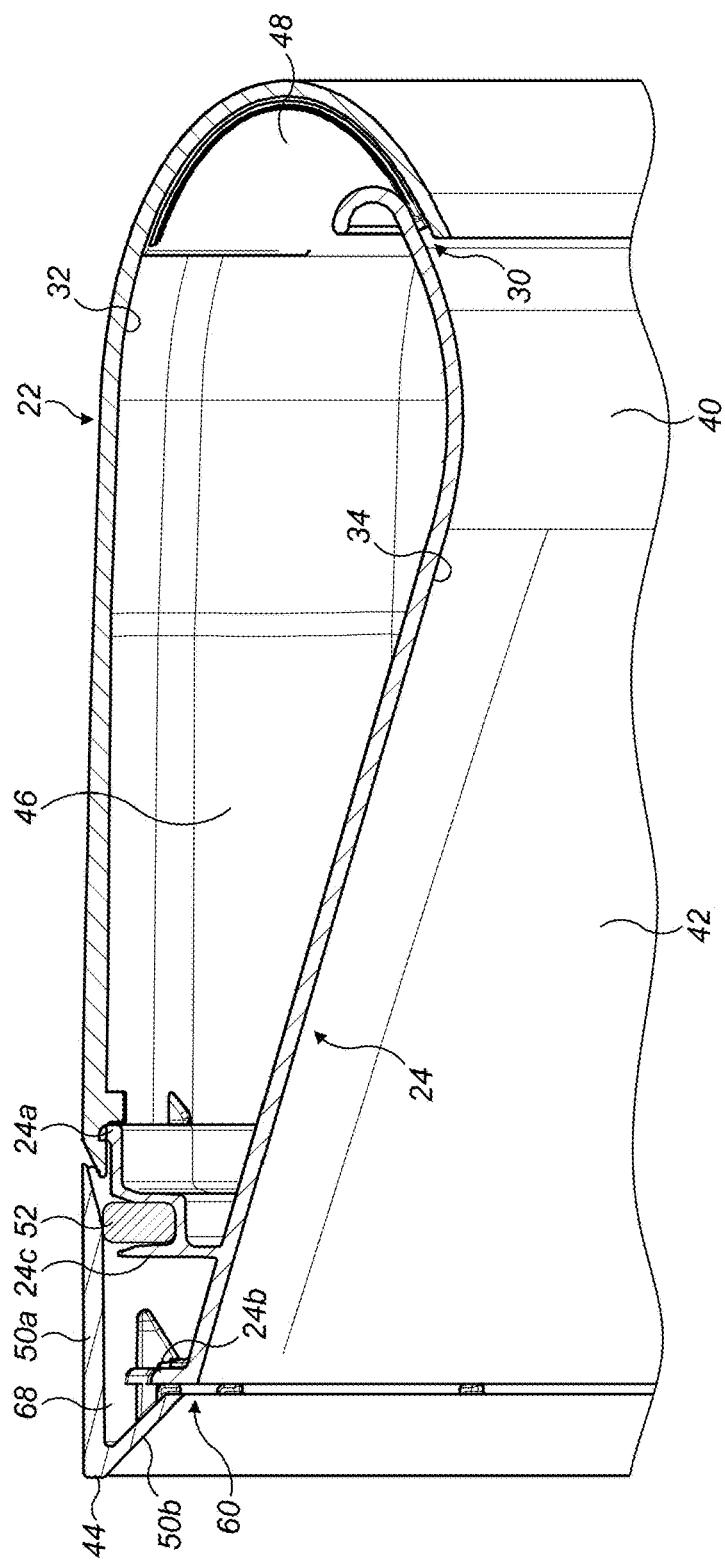

ized.com/*  # HUMIDIFYING APPARATUS

REFERENCE TO RELATED APPLICATIONS

This application claims the priority of United Kingdom Application No. 1511899.5, filed Jul. 7, 2015, the entire contents of which are incorporated herein by reference.

FIELD OF THE INVENTION

The present invention relates to a humidifying apparatus. In a preferred embodiment, the present invention provides a humidifying apparatus for generating a flow of moist air and a flow of air for dispersing the moist air within a domestic environment, such as a room, office or the like.

BACKGROUND OF THE INVENTION

Domestic humidifying apparatus is generally in the form of a portable appliance having a casing comprising a water tank for storing a volume of water, and a fan for creating a flow of air through an air duct of the casing. The stored water is conveyed, usually under gravity, to an atomizing device for producing water droplets from the received water. This device may be in the form of a heater or a high frequency vibrating device, such as a transducer. The water droplets enter the flow of air passing through the air duct, resulting in the emission of a mist into the environment. The appliance may include a sensor for detecting the relative humidity of the air in the environment. The sensor outputs a signal indicative of the detected relative humidity to a drive circuit, which controls the transducer to maintain the relative humidity of the air in the environment around a desired level. Typically, the actuation of the transducer is stopped when the detected relative humidity is around 5% higher than the desired level, and is restarted when the detected relative humidity is around 5% lower than the desired level.

It is known to provide an ultraviolet radiation (UV) emitting lamp or other UV generator to sterilize water that is conveyed to the atomizing device. For example, U.S. Pat. No. 5,859,952 describes a humidifier in which the water supplied from a tank is conveyed through a sterilizing chamber before being conveyed by a pipe to a chamber containing an ultrasonic atomizer The sterilizing chamber has a UV transparent window beneath which a UV lamp is located to irradiate water as it passes through the sterilizing chamber. U.S. Pat. No. 7,540,474 describes a humidifier in which the water tank includes a UV transparent tube for conveying water to an outlet of the tank, and a main body upon which the tank is mounted includes a UV lamp which irradiates water as it passes through the tube to the outlet.

WO 2013/132222 describes a humidifier which comprises a body and an annular nozzle detachably mounted on the body. The body comprises a base and a water tank removably mounted on the base. A motor-driven impeller located within the base draws an air flow into the humidifier through air inlets located in the outer casing of the base. A first air passageway located downstream from the impeller conveys a first part of the air flow to an annular first interior passage within the nozzle. The first part of the air flow is emitted from a first air outlet of the nozzle. A second air passageway located downstream from the impeller conveys a second part of the air flow over a water reservoir which receives water from the water tank. Transducers located within the water reservoir atomize water stored in the water reservoir to humidify the second part of the air flow. An outlet duct defined by the water tank conveys the humidified air flow to an annular second interior passage of the nozzle. The humidified air flow is emitted from a second air outlet of the nozzle so that the humidified air flow becomes entrained within the air emitted from the first air outlet of the nozzle.

The base has a relatively wide cylindrical outer wall, a relatively narrow cylindrical inner wall located above and co-axial with the outer wall, and a recessed annular wall which extends between the inner wall and the outer wall. These walls of the base define the water reservoir, and so the water reservoir is exposed when the water tank is removed from the base. The water reservoir includes a UV transparent tube housing a UV lamp for irradiating water stored in the water reservoir, and baffle plates for guiding water entering the water reservoir from the water tank over the tube so that it is irradiated by the UV lamp before being atomized by the transducers. The water tank is annular in shape, and is mounted by the user on the annular wall of the base so as to surround the inner wall of the base. The base includes a proximity sensor for detecting that the water tank has been mounted on the base. A drive circuit deactivates the motor, the UV lamp and the transducers in response to signal received from the proximity sensor indicating that the water tank has been removed from the base.

In order for a water tank to supply water to a humidifier it must be provided with a cap assembly which permits the flow of air into the water tank at the same time as permitting a flow of water out of the water tank. Air entering the water tank does so in the form of air bubbles, and the size of the bubbles entering the water tank is determined by the size of the inlets on the tank cap. A known problem with existing water tanks is that in order to permit an adequate flow of air into the water tank they have relatively large sized inlets, which in turn allows relatively large air bubbles to enter the water tank. These large air bubbles create a glugging noise which can be unpleasant for users. In order to reduce the size of the air bubbles entering the water tank, and thus reduce the glugging noise, it would be desirable to reduce the size of the inlets on the tank cap. However, with conventional tank cap designs there is a limit to how small the inlet can be before hydrostatic lock occurs and water is unable to flow out of the water tank.

JP 4726760 B2 describes a tank cap assembly for a humidifier having a movable shaft with a valve at one end disposed on a central portion axially movably against a biasing spring. The tank cap assembly has an inner cylindrical wall mounted on a peripheral edge of a water outflow port and outer cylindrical wall connected with a horizontal partitioning wall. The outer cylindrical wall is longer than the inner cylindrical wall in the direction in which the water flows out of the water tank, and an air inlet is provided on the outer cylindrical wall, such that external air is allowed to flow into the water tank through the air inlet when a water level of a water receiving portion becomes lower than an end face of the inner cylindrical wall.

SUMMARY OF THE INVENTION

In a first aspect, the present invention provides a humidifying apparatus comprising a base comprising a chamber, a water tank removably mounted on the base for supplying water to the chamber, an impeller and a motor for driving the impeller to generate an air flow, an inlet duct for conveying the air flow to the chamber, humidifying means for humidifying the air flow with water from the chamber, and an outlet duct for conveying the humidified air flow from the chamber, wherein a lower surface of the water tank, which in use supports the water tank on the base, comprises a recessed portion for receiving water overflow from the chamber.

The recessed portion of the lower surface, in conjunction with a surface of the base, defines an overflow reservoir which is arranged to receive water from the chamber in the situation where the volume of water in the chamber becomes too great. This can happen for a number of reasons, for example it can be caused by changes in atmospheric conditions, or it can be caused by a faulty valve on the water tank. The overflow reservoir receives any overflow from the chamber, thus preventing leakage from the humidifier, which can be unsightly and potentially dangerous.

In an embodiment of the invention the apparatus further comprises an ultraviolet radiation generator for irradiating water stored in the chamber.

In an embodiment of the invention the water tank is annular in shape, and comprises an annular inner wall linked to an annular outer wall by the lower surface of the water tank.

In an embodiment of the invention the water tank at least partially surrounds the impeller and motor. This provides a more compact and aesthetically pleasing product.

In an embodiment of the invention the recessed portion of the lower surface is arcuate.

In an embodiment of the invention the recessed portion extends along at least 50% of the lower surface of the water tank.

Preferably the recessed portion and the base define an overflow chamber with a volume of at least 50 ml, more preferably at least 100 ml, and most preferably at least 160 ml.

In an embodiment of the invention an internal base surface of the water tank comprises a raised portion corresponding to the recessed portion.

In an embodiment of the invention the internal base surface of the water tank comprises the raised portion and a feeder trough which is lower than the raised portion when the water tank is mounted on the base.

In an embodiment of the invention an outlet of the water tank is located in the feeder trough.

In a second aspect, the present invention provides a humidifying apparatus comprising a base comprising a chamber, a water tank removably mounted on the base for supplying water to the chamber, an impeller and a motor for driving the impeller to generate an air flow, an inlet duct for conveying the air flow to the chamber, humidifying means for humidifying the air flow with water from the chamber, and an outlet duct for conveying the humidified air flow from the chamber, wherein a lower internal surface of the water tank comprises a raised portion and a feeder trough, which is lower than the raised portion when the water tank is mounted on the base.

In an embodiment of the invention the humidifying apparatus further comprises an ultraviolet radiation generator for irradiating water stored in the chamber.

In an embodiment of the invention the water tank is annular in shape, and comprises an annular inner wall linked to an annular outer wall by the lower surface of the water tank.

In an embodiment of the invention the water tank at least partially surrounds the impeller and motor.

In an embodiment of the invention an outlet of the water tank is located in the feeder trough. The feeder trough is located lower than the raised surface, such that when a volume of water in the water tank is low it is received in the feeder trough. This helps to ensure that all of the water in the water tank is emptied out of the tank in normal use. It has been shown that when an internal base surface of a water tank is flat then water can pool on the surface and not pass out through the outlet. This is undesirable for operational reasons and for hygiene reasons.

In an embodiment of the invention a downwardly sloping wall connects the raised portion to the feeder trough. The downwardly sloping wall also aids in the emptying of the water tank as water is encouraged to flow towards the feeder tough and the outlet.

Preferably the feeder trough has a capacity of 150 ml or less, more preferably 100 ml or less, and most preferably 60 ml or less.

In an embodiment of the invention an external base surface of the water tank comprises a recessed portion corresponding to the raised portion.

In an embodiment of the invention the recessed portion defines an overflow chamber for receiving water from the chamber when the water tank is mounted on the base.

Features described above in connection with the first aspect of the invention are equally applicable to the second aspect of the invention, and vice versa.

BRIEF DESCRIPTION OF THE DRAWINGS

An embodiment of the present invention will now be described, by way of example only, with reference to the accompanying drawings, in which:

FIG. 5(a) is a front view of a nozzle of the humidifying apparatus, FIG. 5(b) is a bottom sectional view taken along line C-C in FIG. 5(a), and FIG. 5(c) is a close-up of part of FIG. 5(b);

DETAILED DESCRIPTION OF THE INVENTION

Figure 1:
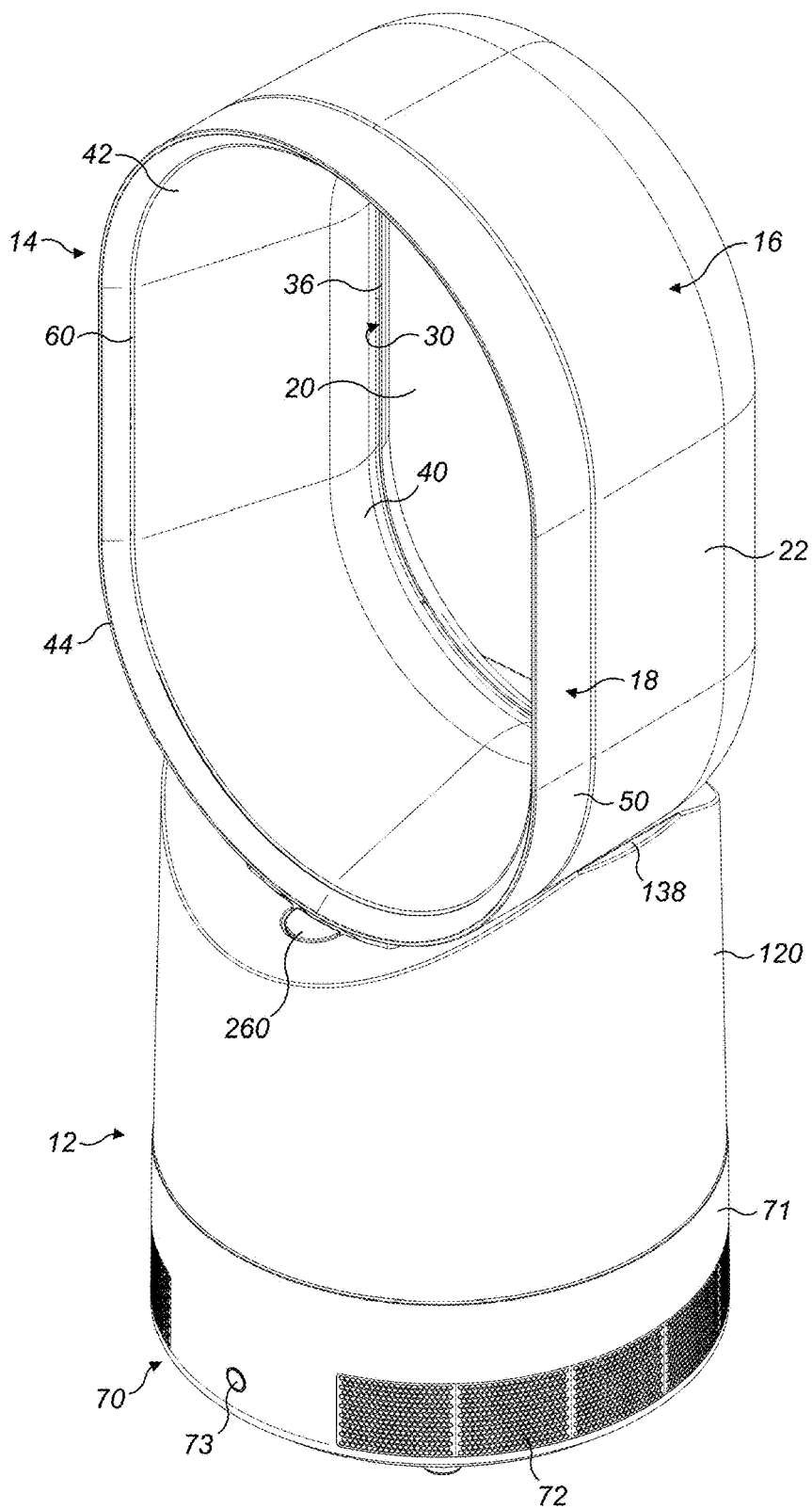
FIG. 1 is a front perspective view of a humidifying apparatus.
Figure 2:
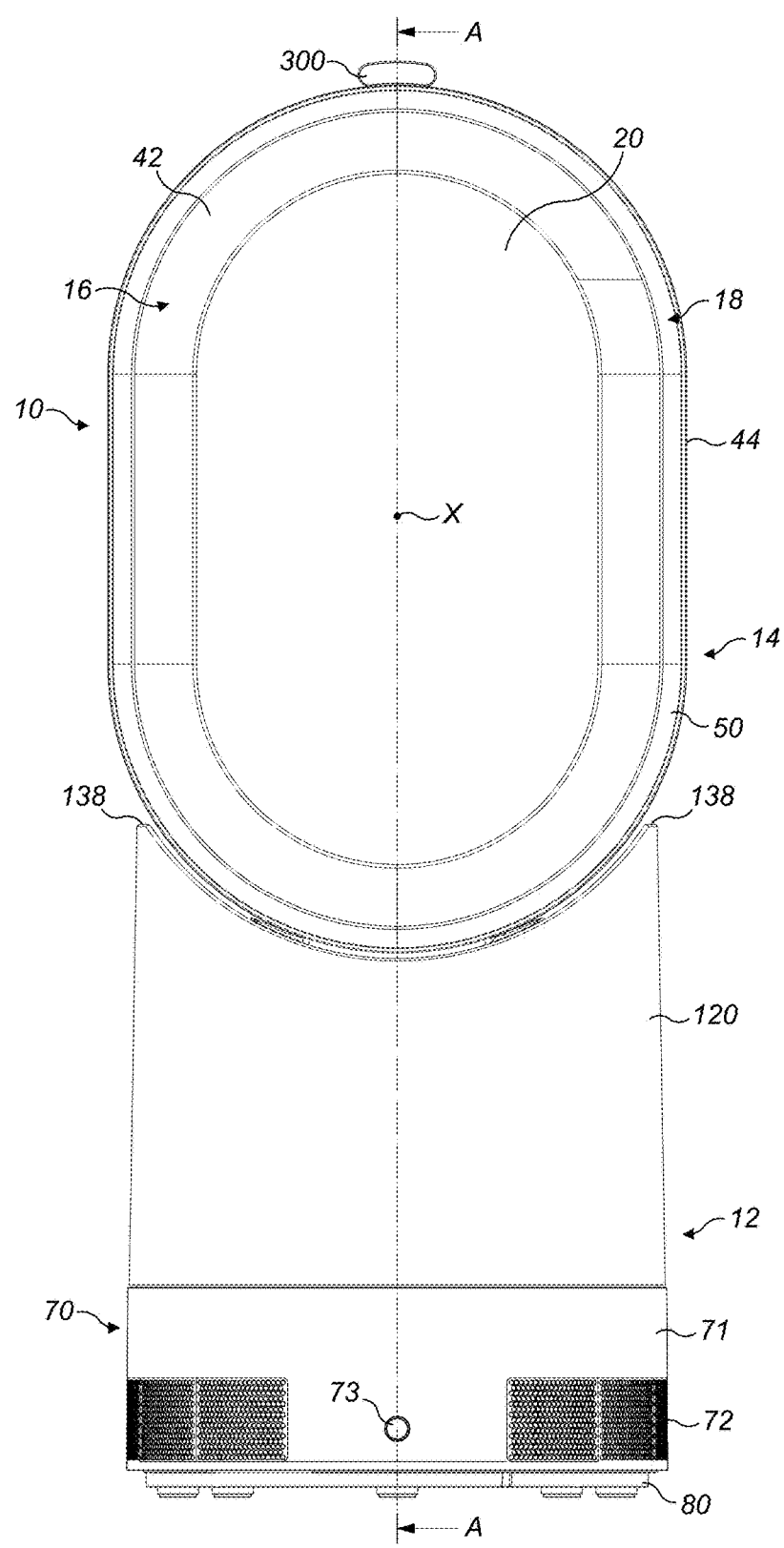
FIG. 2 is a front view of the humidifying apparatus.
Figure 3:
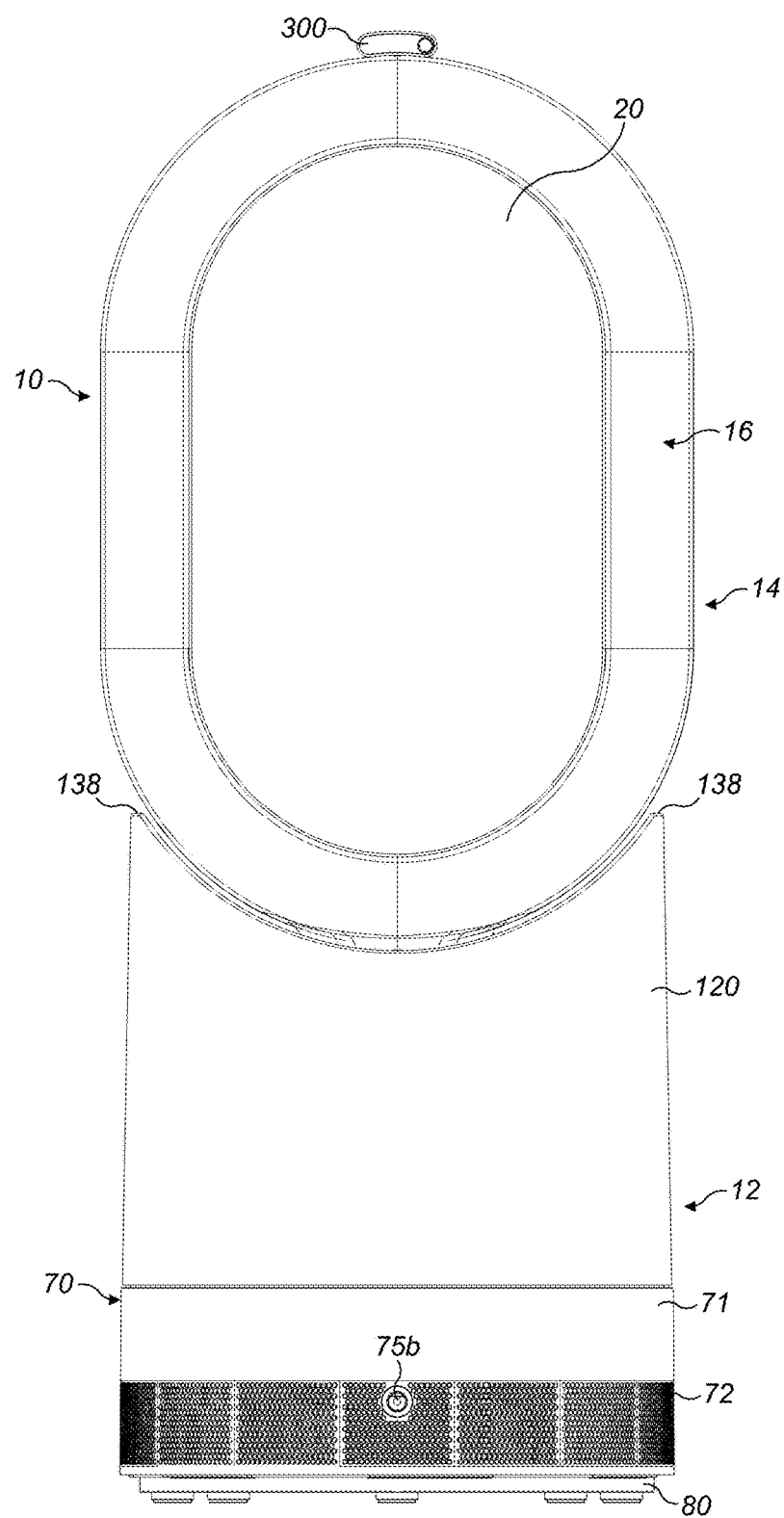
FIG. 3 is a rear view of the humidifying apparatus.

FIGS. 1 to 3 are external views of a fan assembly. In this example, the fan assembly is in the form of a humidifying apparatus 10. In overview, the humidifying apparatus 10 comprises a body 12 comprising an air inlet through which air enters the humidifying apparatus 10, and a nozzle 14 in the form of an annular casing mounted on the body 12, and which comprises a plurality of air outlets for emitting air from the humidifying apparatus 10.

The nozzle 14 is arranged to emit two different air flows. The nozzle 14 comprises a rear section 16 and a front section 18 connected to the rear section 16. Each section 16, 18 is annular in shape, and extends about a bore 20 of the nozzle 14. The bore 20 extends centrally through the nozzle 14 so that the centre of each section 16, 18 is located on the axis X of the bore 20.

In this example, each section 16, 18 has a "racetrack" shape, in that each section 16, 18 comprises two, generally straight sections located on opposite sides of the bore 20, a curved upper section joining the upper ends of the straight sections and a curved lower section joining the lower ends of the straight sections. However, the sections 16, 18 may have any desired shape; for example the sections 16, 18 may be circular or oval. In this embodiment, the height of the nozzle 14 is greater than the width of the nozzle, but the nozzle 14 may be configured so that the width of the nozzle 14 is greater than the height of the nozzle 14.

Each section 16, 18 of the nozzle 14 defines a flow path along which a respective one of the air flows passes. In this embodiment, the rear section 16 of the nozzle 14 defines a first air flow path along which a first air flow passes through the nozzle 14, and the front section 18 of the nozzle 14 defines a second air flow path along which a second air flow passes through the nozzle 14.

With reference also to FIGS. 4(a) to 5(c), the rear section 16 of the nozzle 14 comprises an annular outer casing section 22 connected to and extending about an annular inner casing section 24. Each casing section 22, 24 extends about the bore axis X. Each casing section may be formed from a plurality of connected parts, but in this embodiment each casing section 22, 24 is formed from a respective, single moulded part. Each casing section 22, 24 is preferably formed from plastics material. As shown in FIG. 5(c), the front part of the inner casing section 24 has an annular outer wall 24a which extends generally parallel to the bore axis X, a front end wall 24b and an annular intermediary wall 24c which extends generally perpendicular to the bore axis X and which joins the outer wall 24a to the end wall 24b so that the end wall 24b is positioned forwardly of the intermediary wall 24c. During assembly, the external surface of the outer wall 24a is connected to the internal surface of the front end of the outer casing section 22, for example using an adhesive.

The outer casing section 22 comprises a tubular base 26 which defines a first air inlet 28 of the nozzle 14. The outer casing section 22 and the inner casing section 24 together define a first air outlet 30 of the nozzle 14. As described in more detail below, the first air flow enters the nozzle 14 through the first air inlet 28, and is emitted from the first air outlet 30. The first air outlet 30 is defined by overlapping, or facing, portions of the internal surface 32 of the outer casing section 22 and the external surface 34 of the inner casing section 24. The first air outlet 30 is in the form of a slot. The slot has a relatively constant width in the range from 0.5 to 5 mm. In this example the first air outlet has a width of around 1 mm. Spacers 36 may be spaced about the first air outlet 30 for urging apart the overlapping portions of the outer casing section 22 and the inner casing section 24 to control the width of the first air outlet 30. These spacers may be integral with either of the casing sections 22, 24.

Figure 4A:
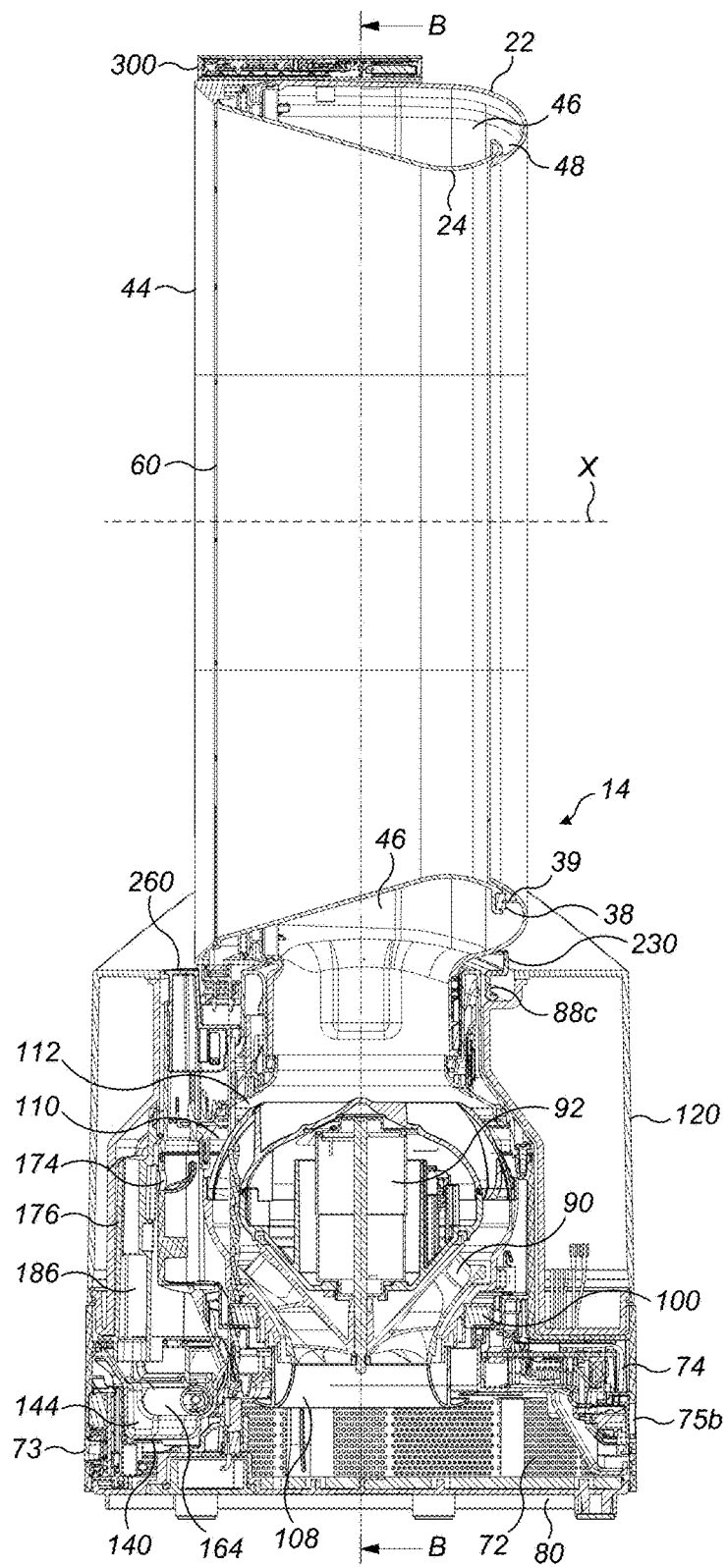
FIG. 4(a) is a side sectional view of the humidifying apparatus taken along line A-A in FIG. 2.

In this embodiment, the first air outlet 30 extends partially about the bore 20. The first air outlet 30 extends along the curved upper section and the straight sections of the nozzle 14. However, the first air outlet 30 may extend fully about the bore 20. As shown in FIG. 4(a), the nozzle 14 includes a sealing member 38 for inhibiting the emission of the first air flow from the curved lower section of the nozzle 14. In this embodiment, the sealing member 38 is generally U-shaped, and is retained by a recess formed in the rear end of the inner casing section 24 so as to lie in a plane which is substantially perpendicular to the axis X. The sealing member 38 engages a U-shaped protrusion 39 extending forwardly from the rear end of the curved lower section of the outer casing section 22 to form a seal therewith.

The first air outlet 30 is arranged to emit air through a front part of the bore 20 of the nozzle 14. The first air outlet 30 is shaped to direct air over an external surface of the nozzle 14. In this embodiment, the external surface 34 of the inner casing section 24 comprises a Coanda surface 40 over which the first air outlet 30 is arranged to direct the first air flow. The Coanda surface 40 is annular, and thus is continuous about the central axis X. The external surface 34 of the inner casing section 24 also includes a diffuser portion 42 which tapers away from the axis X in a direction extending from the first air outlet 30 to the end wall 24b of the inner casing section 24.

The casing sections 22, 24 together define an annular first interior passage 46 for conveying the first air flow from the first air inlet 28 to the first air outlet 30. The first interior passage 46 is defined by the internal surface of the outer casing section 22 and the internal surface of the inner casing section 24. A tapering, annular mouth 48 of the rear section 16 of the nozzle 14 guides the first air flow to the first air outlet 30. A first air flow path through the nozzle 14 may therefore be considered to be formed from the first air inlet 28, the first interior passage 46, the mouth 48 and the first air outlet 30.

The front section 18 of the nozzle 14 comprises an annular front casing section 50. The front casing section 50 extends about the bore axis X, and has a "racetrack" shape which is similar to that of the other casing sections 22, 24 of the nozzle 14. Similar to the casing sections 22, 24, the front casing section 50 may be formed from a plurality of connected parts, but in this embodiment the front casing section 50 is formed from a single moulded part. The front casing section 50 is preferably formed from plastics material.

The front casing section 50 comprises an annular outer wall 50a which extends generally parallel to the bore axis X, and an annular inner wall 50b connected to the outer wall 50a at the front end 44 of the nozzle 14. The inner wall 50b is angled to the outer wall 50a so that the inner wall 50b tapers towards the axis X. During assembly, the front casing section 50 is attached to the inner casing section 24, for example using a series of snap-fit connections between the outer wall 50a of the front casing section 50 and the intermediary wall 24c of the inner casing section 24. An annular sealing member 52 forms an air-tight seal between the inner casing section 24 and the front casing section 50.

Figure 6A:
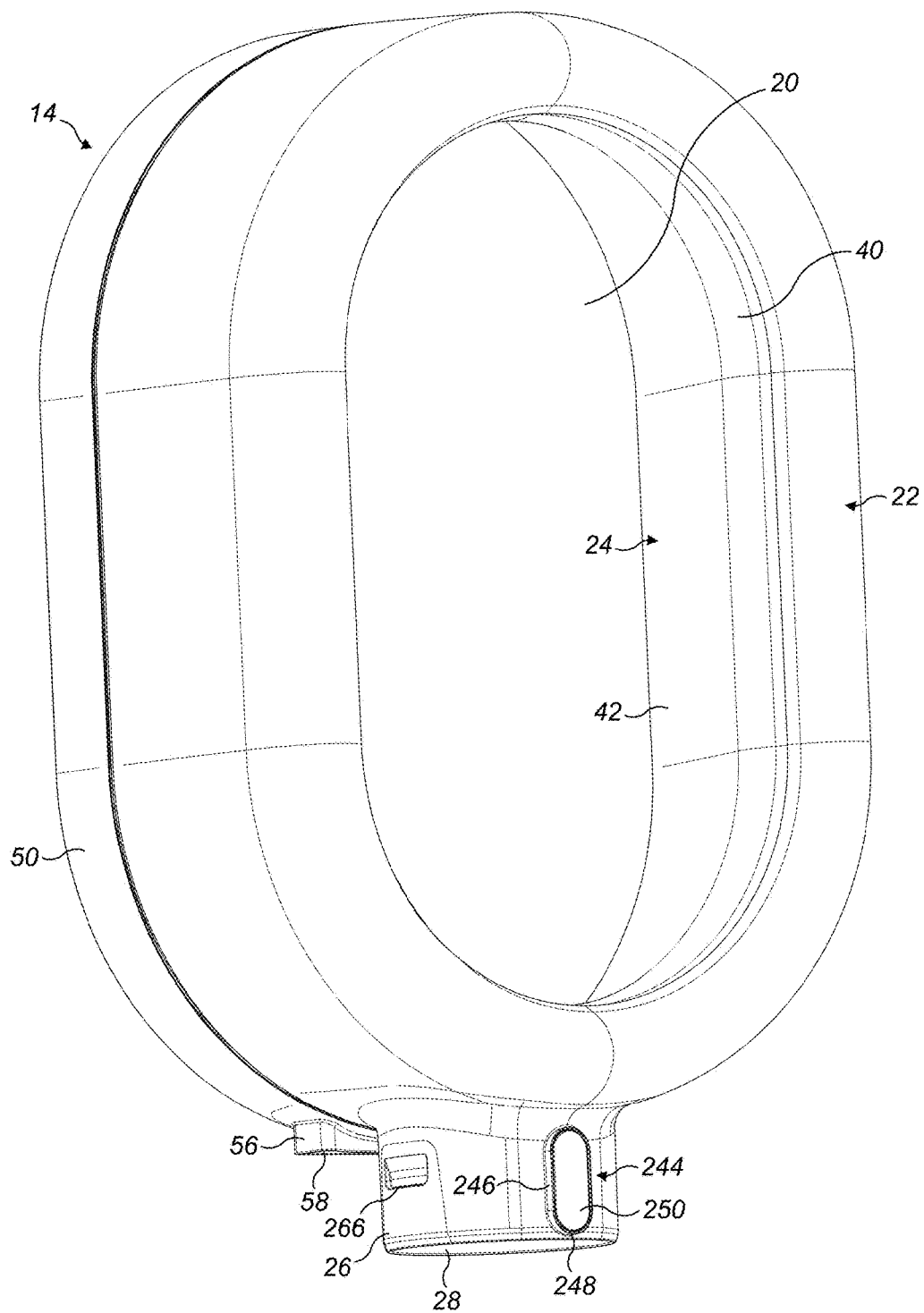
FIG. 6(a) is a rear perspective view, from below, of the nozzle.
Figure 7A:
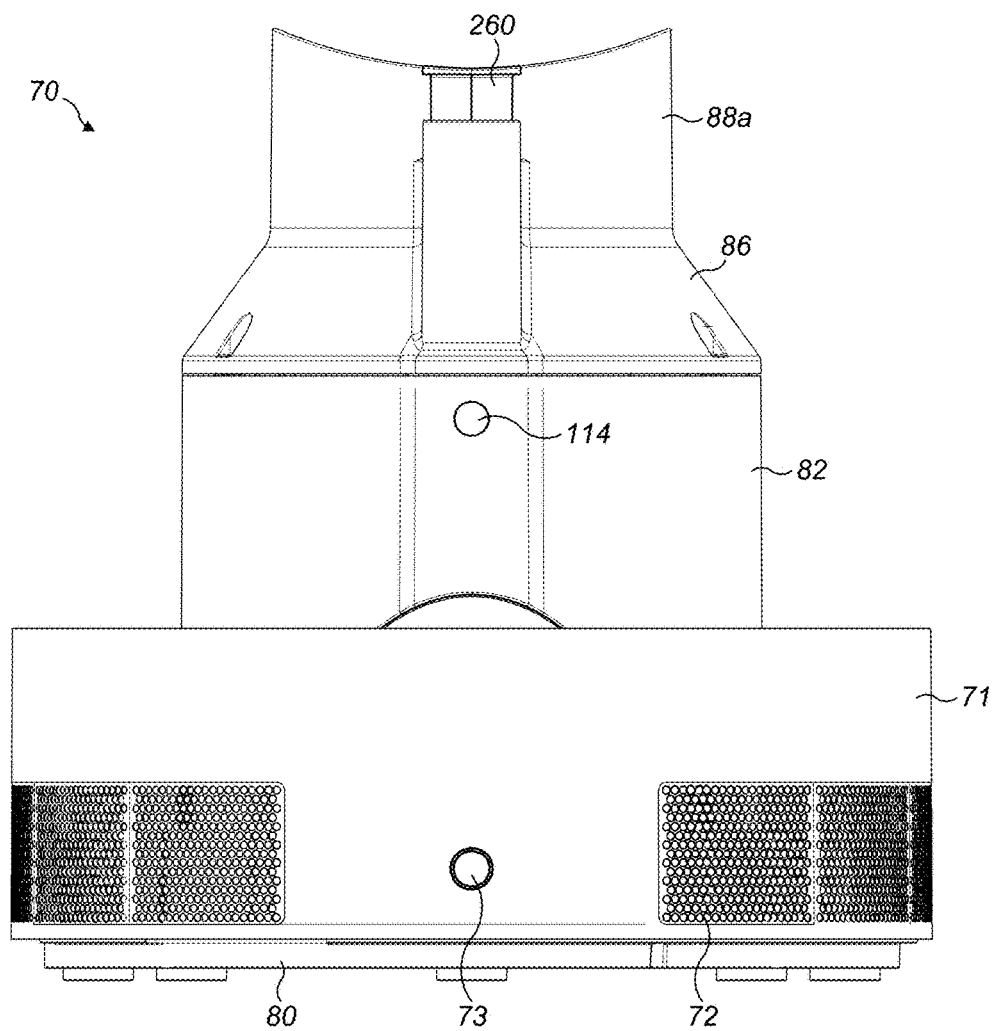
FIG. 7(a) is a front view of a base of the humidifying apparatus.
Figure 7B:
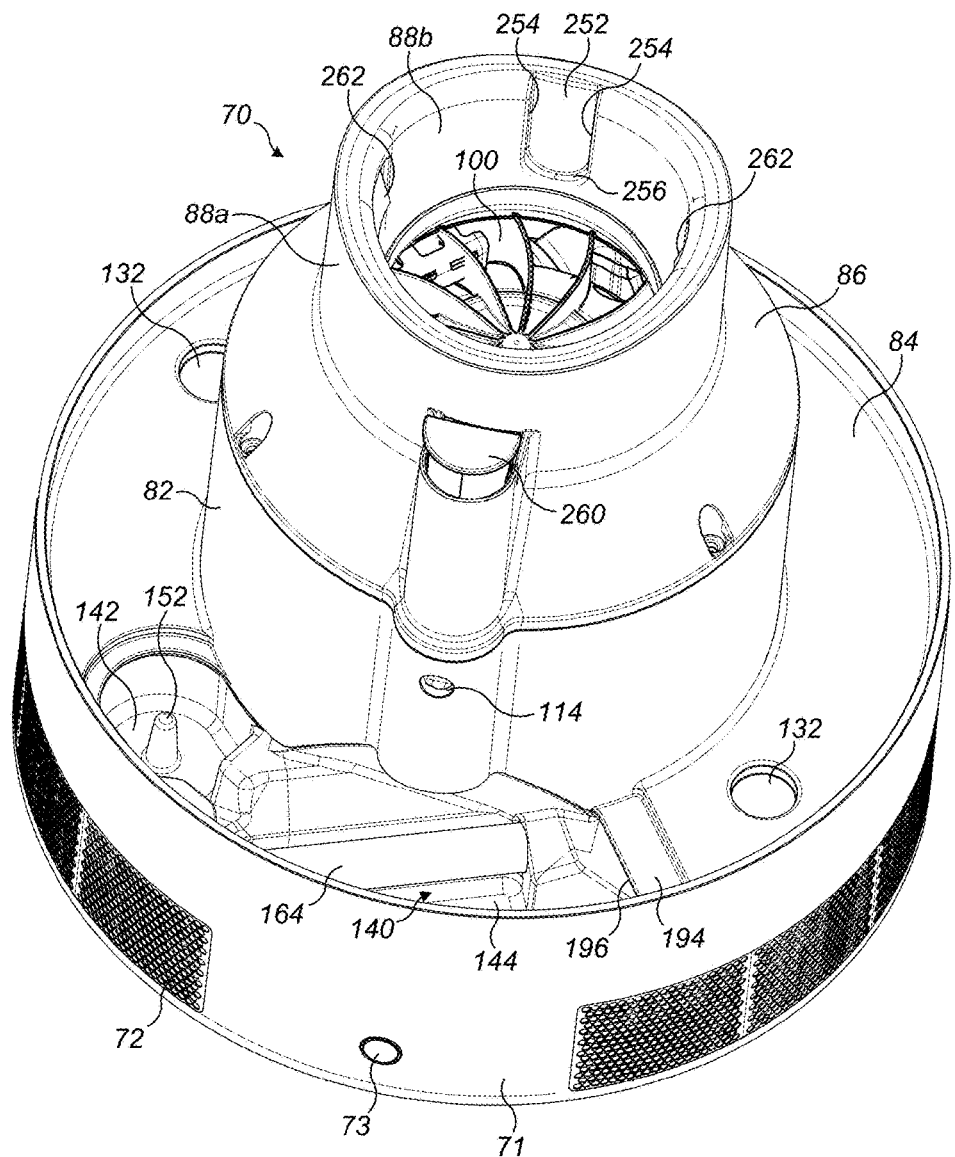
FIG. 7(b) is a front perspective view, from above, of the base.
Figure 7C:
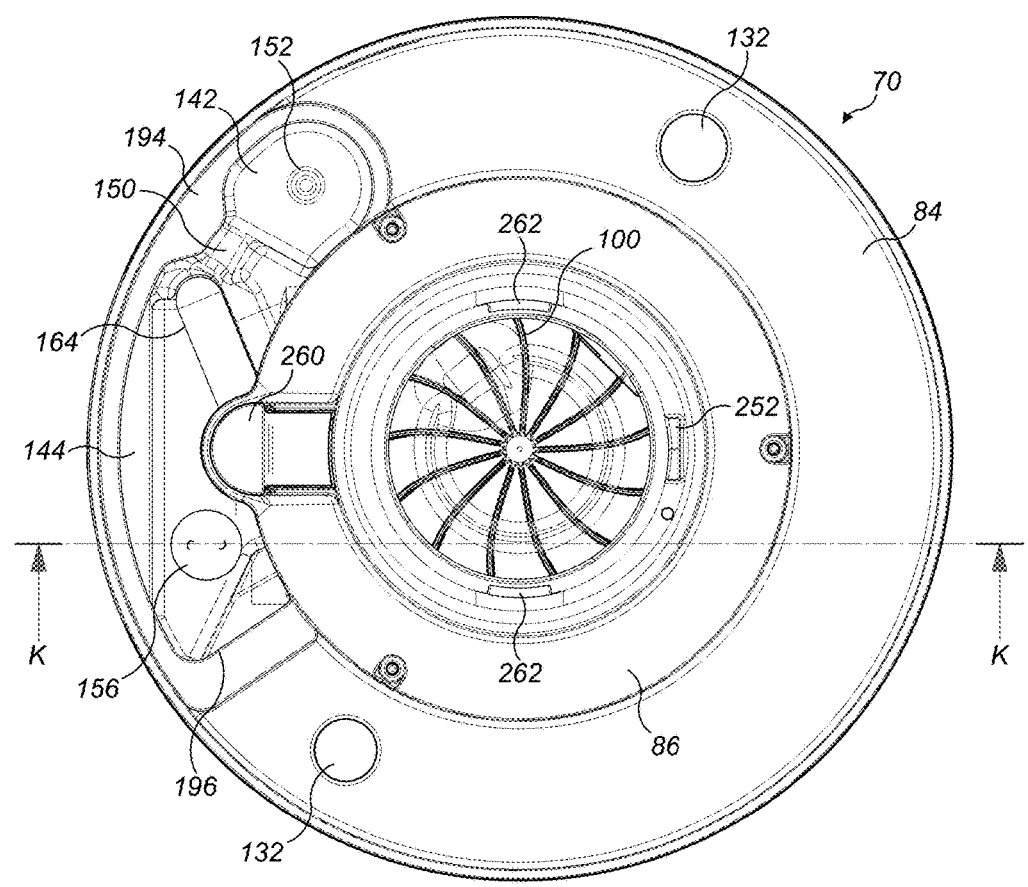
FIG. 7(c) is a top view of the base.
Figure 7D:
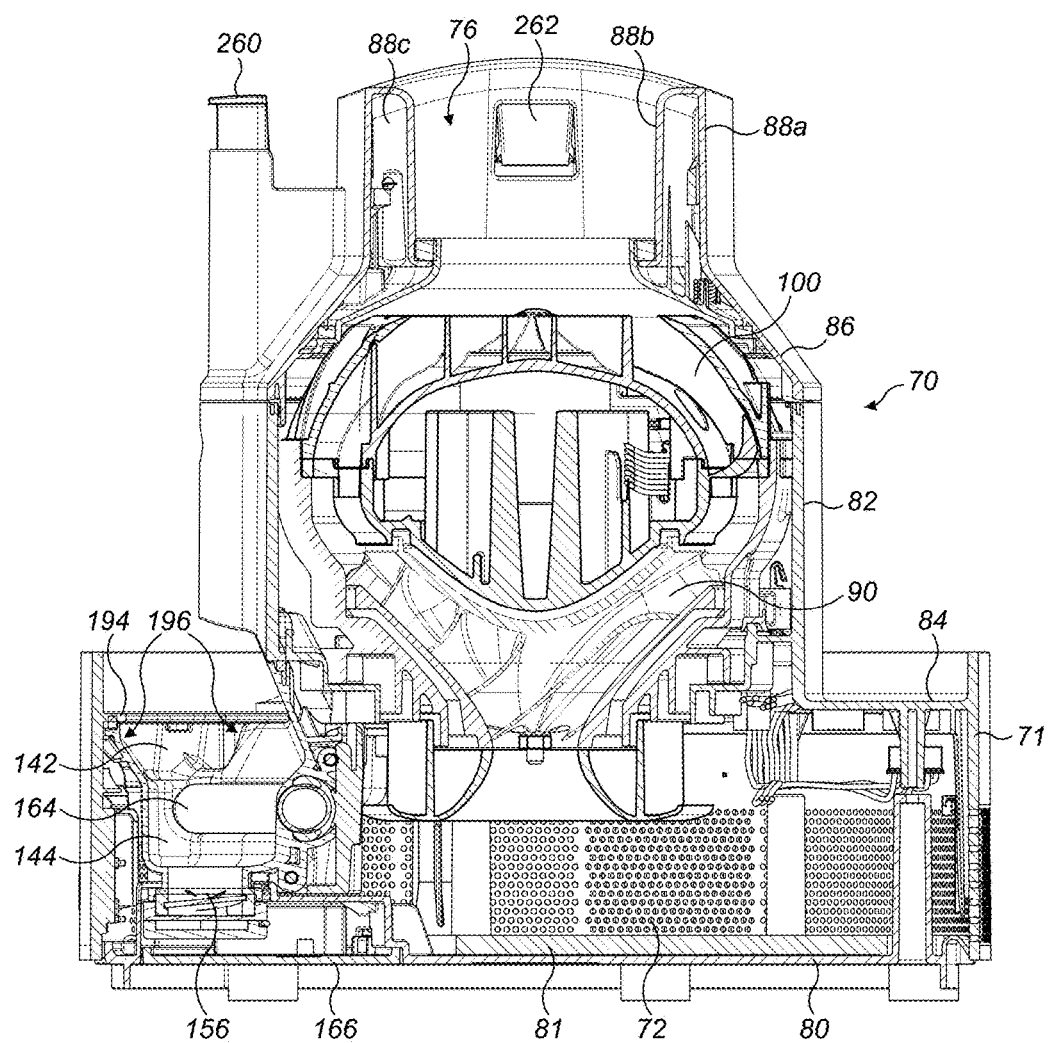
FIG. 7(d) is a section view taken along line K-K in FIG. 7(c)

With reference to FIG. 6(a), the lower end of the front casing section 50 comprises a tubular base 56. The base 56 defines a second air inlet 58 of the nozzle 14. The front casing section 50 defines with the inner casing section 24 a second air outlet 60 of the nozzle 14. In this example, the second air outlet 60 extends partially about the bore 20, along the curved upper section and the straight sections of the nozzle 14. Alternatively, the second air outlet 60 may extend fully about the bore 20. As another alternative, the nozzle 14 may comprise a plurality of second air outlets, with each of the straight sections of the nozzle 14 comprising a respective second air outlet.

In this embodiment, the second air outlet 60 is in the form of a slot having a relatively constant width in the range from 0.5 to 5 mm. In this example the second air outlet 60 has a width of around 1 mm. The second air outlet 60 is located between the end wall 24*b* of the inner casing section 24 and the inner wall 50*b* of the front casing section 50. Spacers 62 may be spaced apart along the second air outlet 60 to urge apart the overlapping portions of the inner casing section 24 and the front casing section 50 to control the width of the second air outlet 60. These spacers may be integral with either of the casing sections 24, 50. The second air outlet 60 is configured to emit the second air flow into the bore 20 of the nozzle 14, preferably towards the axis X of the nozzle and more preferably in a plane which is orthogonal to the axis X of the nozzle 14.

The casing sections 24, 50 together define an annular second interior passage 68 for conveying the second air flow from the second air inlet 58 to the second air outlet 60. The second interior passage 68 is defined by the internal surfaces of the inner casing section 24 and the front casing section 50. A second air flow path through the nozzle 14 may therefore be considered to be formed by the second air inlet 58, the interior passage 68 and the second air outlet 60.

Returning to FIGS. 1 to 3, the body 12 is generally cylindrical in shape. The body 12 comprises a base 70. The base is illustrated in more detail in FIG. 8. The base 70 has an external outer wall 71 which is cylindrical in shape, and which comprises an air inlet 72. In this example, the air inlet 72 comprises a plurality of apertures formed in the outer wall 71 of the base 70. A front portion of the base 70 may comprise a user interface of the humidifying apparatus 10. The user interface comprises at least one user actuable switch or button 73 and a drive circuit 74. The drive circuit is indicated generally at 74 in FIG. 4(*a*). A detachable mains power cable (not shown) for supplying electrical power to the humidifying apparatus 10 is connected to the drive circuit 74 via a connector located behind an aperture 75*b* formed in the outer wall 71 of the base 70. To connect the drive circuit 74 to the mains power supply, the user inserts the cable through the aperture 75*b* to connect the cable to the connector.

Figure 4B:
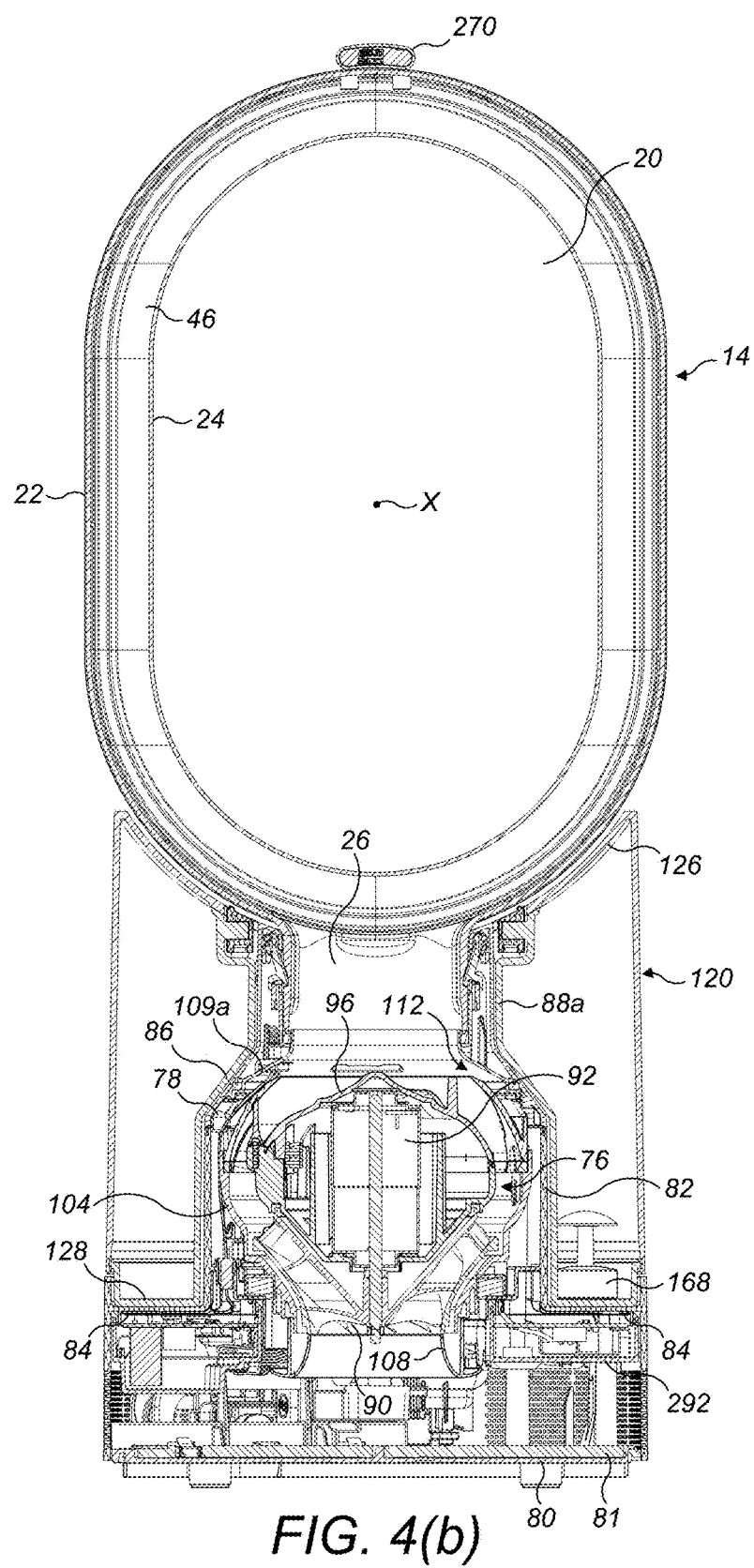
FIG. 4(b) is a front sectional view of the humidifying apparatus taken along line B-B in FIG. 4(a)

With reference also to FIG. 4 and FIG. 7, the base 70 comprises a first air passageway 76 for conveying a first air flow to the first air flow path through the nozzle 14, and a second air passageway 78 for conveying a second air flow to the second air flow path through the nozzle 14. The first air passageway 76 passes through the base 70 from the air inlet 72 to the first air inlet 28 of the nozzle 14. The base 70 comprises a bottom wall 80 connected to the lower end of the outer wall 71. A sheet 81 of silencing foam is located on the upper surface of the bottom wall 80. A tubular central wall 82, having a smaller diameter than the outer wall 71, is connected to the outer wall 71 by an arcuate supporting wall 84. The central wall 82 is substantially co-axial with the outer wall 71. The supporting wall 84 is located above, and generally parallel to, the bottom wall 80. The supporting wall 84 extends partially about the central wall 82 to define an opening for exposing a water reservoir 140 of the base 70, as described in more detail below. The central wall 82 extends upwardly away from the supporting wall 84. In this example, the outer wall 71, central wall 82 and supporting wall 84 are formed as a single component of the base 70, but alternatively two or more of these walls may be formed as a respective component of the base 70. An upper wall of the base 70 is connected to the upper end of the central wall 82. The upper wall has a lower frustoconical section 86 and an upper cylindrical section. The upper cylindrical section comprises a double-skinned wall which comprises an outer cylindrical wall 88*a* connected to the frustoconical section 86 and an inner cylindrical wall 88*b* into which the base 26 of the nozzle 14 is inserted. The walls 88*a*, 88*b* define an annular housing 88*c* within the upper cylindrical section of the base 70.

The central wall 82 extends about an impeller 90 for generating a first air flow through the first air passageway 76. In this example the impeller 90 is in the form of a mixed flow impeller. In overview, the impeller 90 is connected to a rotary shaft extending outwardly from a motor 92 for driving the impeller 90. In this embodiment, the motor 92 is a DC brushless motor having a speed which is variable by the drive circuit 74 in response to a speed selection by a user. The maximum speed of the motor 92 is preferably in the range from 5,000 to 10,000 rpm. The motor 92 is housed within a motor bucket comprising a domed upper portion 96 connected to a lower portion 98. A set of guide vanes 100 is connected to the upper surface of the upper portion 96 of the motor bucket to guide air towards the first air inlet 28 of the nozzle 14. Further features of the impeller 92 and the motor bucket are described below.

The motor bucket is located within, and mounted on, a generally frustoconical impeller housing 104. The impeller housing 104 is, in turn, mounted on an annular platform 106 extending inwardly from the central wall 82. An annular inlet member 108 is connected to the bottom of the impeller housing 104 for guiding the air flow into the impeller housing 104. An annular sealing member 110 is located between the impeller housing 104 and the platform 106 to prevent air from passing around the outer surface of the impeller housing 104 to the inlet member 108. The platform 106 preferably comprises a guide portion for guiding an electrical cable 107 from the drive circuit 74 to the motor 92.

The first air passageway 76 extends from the air inlet 72 to the inlet member 108. From the inlet member 108, the first air passageway 76 extends, in turn, through the impeller housing 104, the upper end of the central wall 82 and the sections 86, 88 of the upper wall. A frustoconical baffle 109*a* connected to the internal surfaces of the sections 86, 88 of the upper walls serves to guide the first air flow emitted from the impeller housing 104 into the base 26 of the nozzle 14. An annular seal extending around the upper end of the baffle 109*a* engages the end of the base 26 of the nozzle 14 to form an air tight seal between the nozzle 14 and the base 70.

The second air passageway 78 is arranged to receive air from the first air passageway 76. The second air passageway 78 is located adjacent to the first air passageway 76. The second air passageway 78 comprises a duct 110 for receiving air from the first air passageway 76. The duct 110 has an annular inlet port 112 located downstream from the guide vanes 100 so as to receive part of the air flow emitted from the guide vanes 100, and which forms the second air flow. The duct 110 extends between the impeller housing 104 and the baffle 109*a* to an outlet port 114 located on the central wall 82 of the base 70.

The humidifying apparatus 10 is configured to increase the humidity of the second air flow before it enters the nozzle 14. With reference now to FIGS. 1 to 4 and FIGS. 8(*a*) to 8(*c*), the humidifying apparatus 10 comprises a water tank 120 removably mountable on the base 70 of the body 12. The water tank 120 has a cylindrical outer wall 122 which has the same radius as the outer wall 71 of the base 70 of the body 12 so that the body 12 has a cylindrical appearance when the water tank 120 is mounted on the base 70. The water tank 120 has a tubular inner wall 124 which surrounds the walls 82, 86, 88 of the base 70 when the water tank 120 is mounted on the base 70. The outer wall 122 and the inner wall 124 define, with an annular upper wall 126 and an annular lower wall 128 of the water tank 120, an annular volume for storing water. The water tank 120 thus surrounds the impeller 90 and the motor 92, and so at least part of the first air passageway 76, when the water tank 120 is mounted on the base 70.

The outer wall 122 is formed from material which is transparent to visible light to allow a user to observe the volume of water stored within the water tank 120. For the same reason, the upper wall 126 is preferably formed from the same material as the outer wall 122. The outer wall 122 and the upper wall 126 may be joined together using an adhesive, or using a laser welding technique. These walls 122, 126 are preferably formed from a transparent plastics material. The inner wall 124 and the lower wall 128 are preferably integral, and do not need to be formed from the same plastics material as the outer wall 122 and the upper wall 126. In this embodiment the inner wall 124 and the lower wall 128 are formed from material which is opaque to ultraviolet radiation, and preferably also visible light, so that the portion of the base 70 which is surrounded by, or covered by, the inner wall 124 and the lower wall 128 is not visible to the user when the water tank 120 is mounted on the base 70. An adhesive is used to connect the inner wall 124 to the upper wall 126, and to connect the outer wall 122 to the lower wall 128.

A portion of an external surface of the lower wall 128 of the water tank 120 engages, and is supported by, the supporting wall 84 of the base 70 when the water tank 120 is mounted on the base 70. Protrusions 130 may be formed on, or mounted on, the lower wall 128 for location within recesses 132 formed on the supporting wall 84 of the base 70 to ensure accurate angular positioning of the water tank 120 on the base 70. The protrusions 130 may be in the form of magnets which interact with other magnets (not shown) mounted beneath the recesses 132 on the lower surface of the supporting wall 84 to assist with the accurate location of the water tank 120 on the base 70, and to increase the force required to move the water tank 120 relative to the base 70. This can reduce the risk of accidental movement of the water tank 120 relative to the base 70.

The lower wall 128 comprises a peripheral rim 128*a*, which engages the supporting wall 84 of the base 70, and an arcuate recessed portion 128*b*. When the water tank 120 is mounted on the base 70 the recessed portion 128*b* is spaced from the supporting wall 84 to define an overflow reservoir capable of receiving water from the water reservoir 140 on the base 70. The recessed portion 128*b* and the supporting wall 84 define an overflow reservoir with a volume of approximately 160 ml. Factors such as changes in atmospheric pressure can cause water in the reservoir 140 to overflow and this can be received in the overflow reservoir. This prevents water from leaking out of the humidifier, which can cause mess and concern for users. When the water tank 120 is mounted on the base 70 the arcuate recessed portion is aligned with the arcuate supporting wall of the base 70.

Figure 8A:
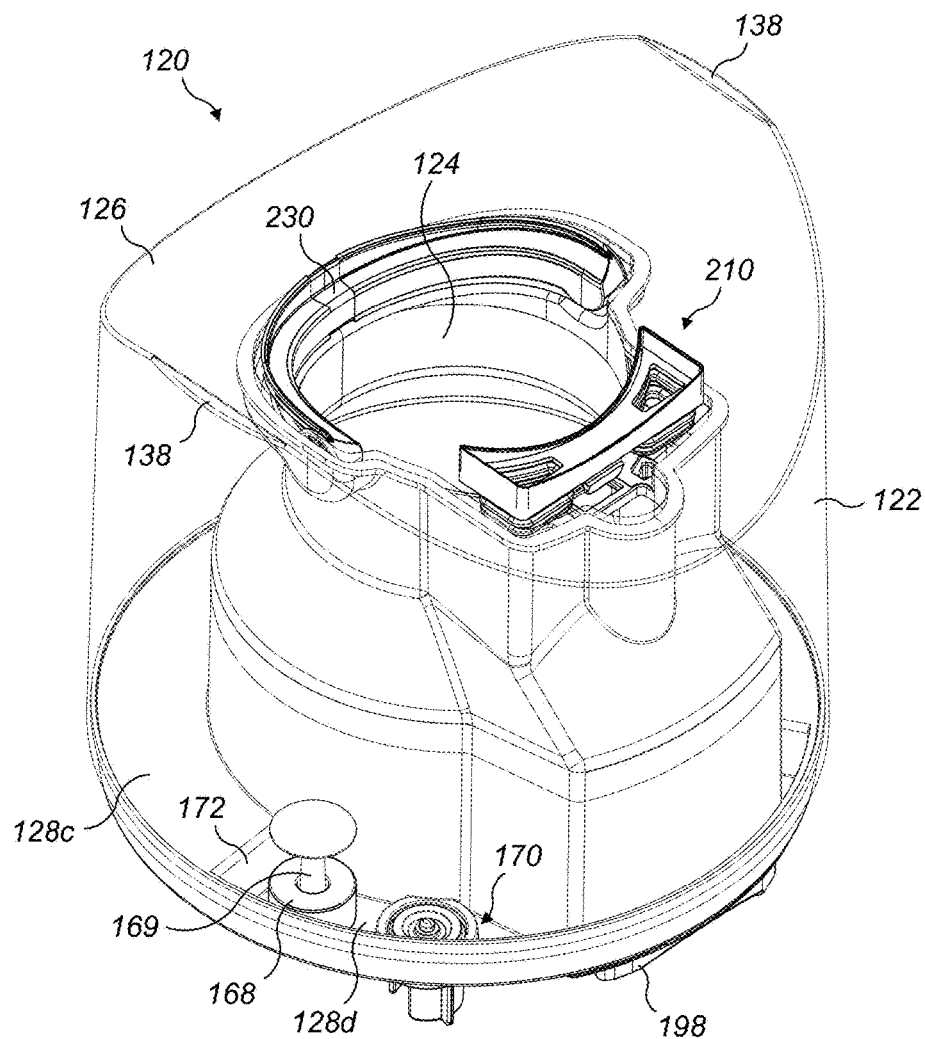
FIG. 8(a) is a front perspective view, from above, of a water tank of the humidifying apparatus.
Figure 8B:
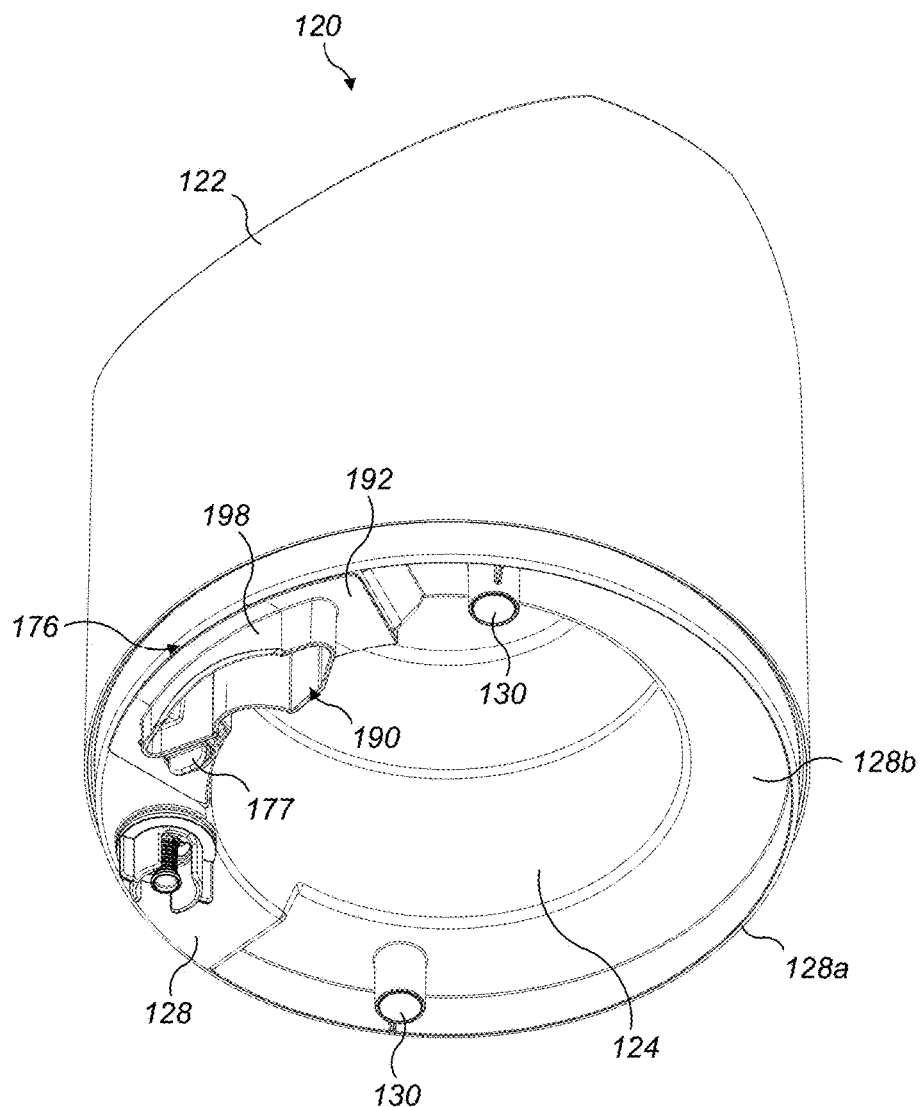
FIG. 8(b) is a front perspective view, from below, of the water tank.
Figure 8C:
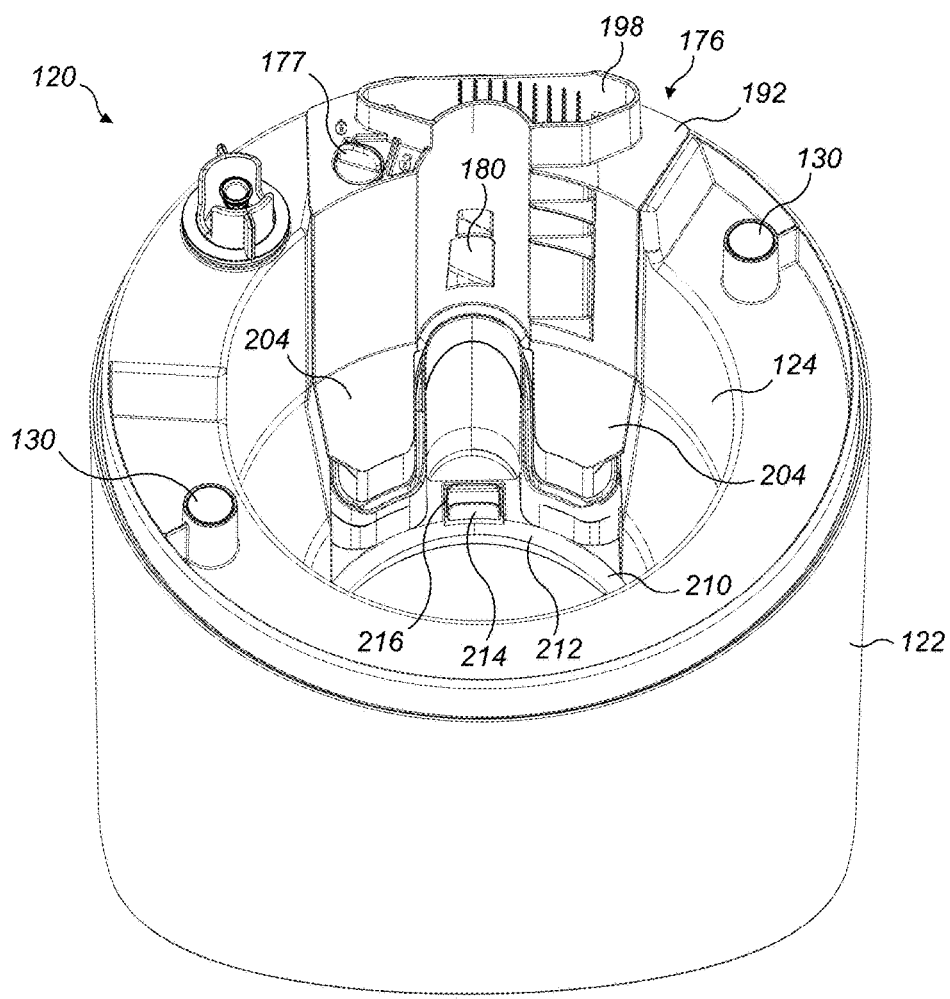
FIG. 8(c) is a rear perspective view, from below, of the water tank.
Figure 9A:
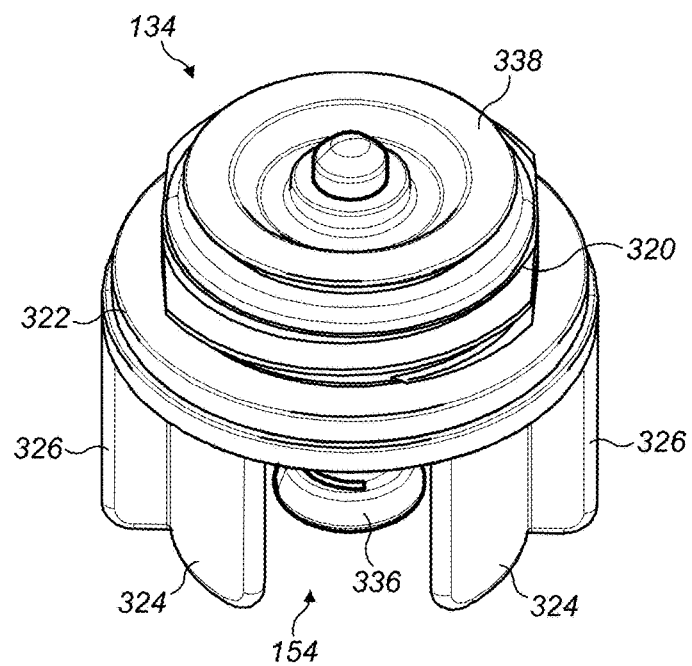
FIG. 9(a) is a perspective view of the tank cap.
Figure 9B:
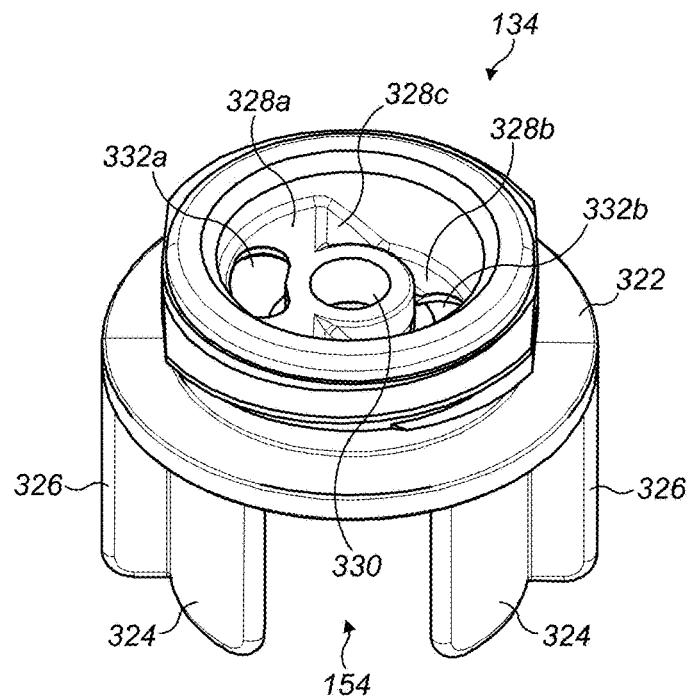
FIG. 9(b) is a perspective view of the tank cap of FIG. 9(a) with the sealing skirt removed.
Figure 9C:
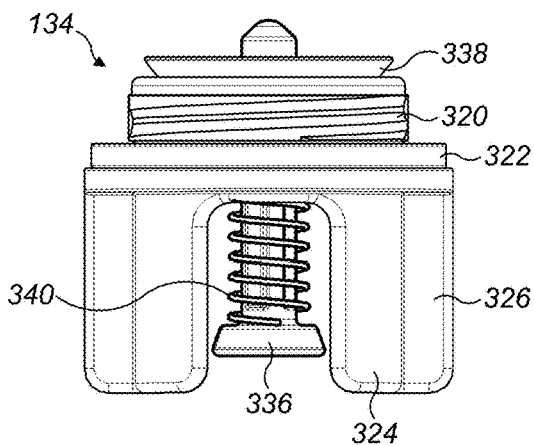
FIG. 9(c) is a front view of the tank cap.
Figure 9D:
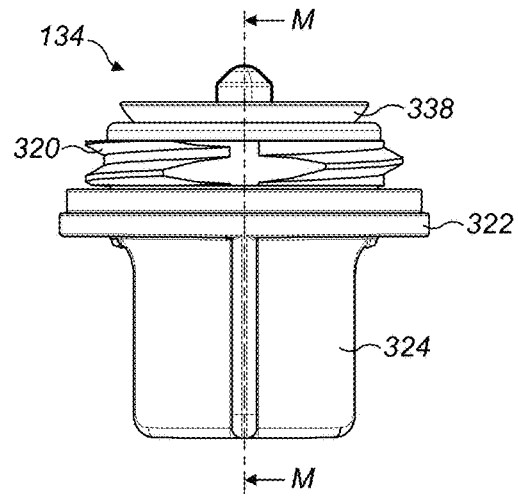
FIG. 9(d) is a side view of the tank cap.
Figure 9E:
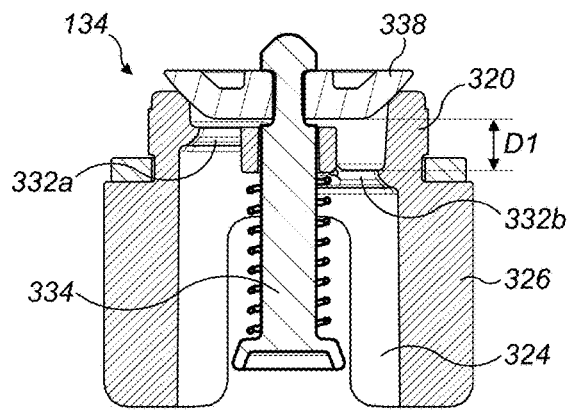
FIG. 9(e) is a section view taken along line M-M in FIG. 9(d).

With reference to FIG. 8(*a*), it can be seen that the arcuate recessed portion 128*b* on the external surface of the lower wall 128 corresponds with an arcuate raised portion 128*c* on an inner surface of the lower wall 128. The inner surface of the lower wall 128 comprises the arcuate raised portion 128*c* and a feeder trough 128*d*, which is located lower than the arcuate raised portion 128*c* when the water tank 120 is mounted on the base 70. The feeder trough 128*d* contains a float 168 mounted on a fixed pin 169 for detecting the water level in the water tank 120 and an aperture 170 through which the water tank 120 can be filled and through which water exits the water tank 120 in use of the humidifier 10.

The feeder trough 128*d* has a capacity of approximately 60 ml. As will be described in more detail below, the aperture 170 is closed by a tank cap 134 which is removably connected to the lower wall 128 of the water tank 120 through cooperating threaded connections. The float 168 may be provided with a magnet, and a level sensor may be provided in the base 70 for detecting the position of the float 168 and providing a signal which is indicative of the level of the water in the water tank 120. The arcuate raised portion 128*c* of the inner surface of the lower wall 128 extends around a major portion of the water tank 120 and is connected to the feeder trough 128*d* by a downwardly sloping wall 172. In use the downwardly sloping wall 172 and feeder trough 128*d* serve to aid emptying of water from the water tank 120.

The water tank 120 preferably has a capacity in the range from 2 to 4 liters. A tank cap 134 is removably connected to the lower wall 128 of the water tank 120, for example through co-operating threaded connections. In this example the water tank 120 is filled by removing the water tank 120 from the base 70 and inverting the water tank 120 so that the tank cap 134 is projecting upwardly. The tank cap 134 is then unscrewed from the water tank 120 and water is introduced into the water tank 120 through the aperture 170 in the lower wall 128, which is exposed when the tank cap 134 is disconnected from the water tank 120. Once the water tank 120 has been filled, the user reconnects the tank cap 134 to the water tank 120, returns the water tank 120 to its non-inverted orientation and replaces the water tank 120 on the base 70. A spring-loaded valve 136 is located within the tank cap 134 for preventing leakage of water through a water outlet of the tank cap 134 when the water tank 120 is re-inverted.

FIGS. 9(*a*) to FIG. 9(*e*) show the tank cap 134 removed from the water tank 120. The tank cap 134 comprises an upper cylindrical wall 320 with a screw thread on its outer surface for engaging with a co-operating screw thread on the tank 120 for connecting the tank cap 134 to the tank 120. An annular flange 322 extends radially outwardly from a lower end of the upper cylindrical wall 320. A lower cylindrical wall 324 extends downwardly from a lower surface of the annular flange 322. The lower cylindrical wall 324 is co-axial with the upper cylindrical wall 320 and has the substantially the same diameter. The lower cylindrical wall 324 has two diametrically opposed slots 154 which extend from a lower end of the lower cylindrical wall 324 to just below the annular flange 322. Two fins 326 extend radially outwardly from the lower cylindrical wall 324 to facilitate gripping and twisting of the tank cap 134 for rotation relative to the tank 120.

An annular wall 328 extends inwardly from an inner surface of the upper cylindrical wall 320 and defines a central circular bore 330. The annular wall 328 is stepped, such that it comprises an upper section 328*a* and a lower section 328*b*. The upper section 328*a* and the lower section 328*b* are substantially parallel and they are linked by a sloping intermediate section 328*c*. The upper section 328*a* and the lower section 328*b* are offset by approximately 3.5 mm in a direction, D1, measured along the longitudinal axis of the tank cap 134. The upper section 328*a* and the lower section 328*b* comprise diametrically opposed apertures 332*a*, 332*b*. The apertures 332*a*, 332*b* are kidney bean-shaped, that is to say in the shape of an oval in which one of the long sides is concave and the other is convex.

A spring-loaded valve 136 comprises a pin 334 which extends through the bore 330. The pin 334 comprises a radially extending flange 336 at its lower end and a sealing skirt 338 at its upper end. A spring 340 is provided on the pin 334 such that when the pin 334 extends through the bore 330 the spring 340 is trapped between the radial flange 336 on the lower end of the pin 334 and the underside of the annular wall 328. The spring 340 biases the sealing skirt 338 into sealing engagement with an upper surface of the upper cylindrical wall 320 to prevent leakage of water from the water tank 120 when it is removed from the base 70. In order to open the valve 136 a force must be applied to the underside of the radially extending flange 336 to move it in a direction towards the underside of the annular wall 320. This causes the spring 340 to compress and moves the sealing skirt 338 away from sealing contact with the upper surface of the of the upper cylindrical wall 320, as will be described in more detail below.

The upper wall 126 of the water tank 120 comprises one or more supports 138 for supporting the inverted water tank 120 on a work surface, counter top or other support surface. In this example, two parallel supports 138 are formed in the periphery of the upper wall 126 for supporting the inverted water tank 120.

With reference now to FIGS. 4 and 7, the base 70 comprises a water reservoir 140 for receiving water from the water tank 120. The water reservoir 140 is a separate component which is connected to the lower surface of the supporting wall 84 of the base 70, and which is exposed by the opening formed in the supporting wall 84. The water reservoir 140 comprises an inlet chamber 142 for receiving water from the water tank 120, and an outlet chamber 144 for receiving water from the inlet chamber 142, and in which water is atomised to become entrained within the second air flow. The inlet chamber 142 is located on one side of the water reservoir 140, and the outlet chamber 144 is located on the other side of the water reservoir 140. The water reservoir 140 comprises a base and a side wall extending about and upstanding from the periphery of the base. The base is shaped so that the depth of the outlet chamber 144 is greater than the depth of the inlet chamber 142. The sections of the base located within each chamber 142, 144 are preferably substantially parallel, and are preferably parallel to the bottom wall 80 of the base 70 so that these sections of the base are substantially horizontal when the humidifying apparatus 10 is located on a horizontal support surface. A channel 150 formed in the water reservoir 140 allows water to pass from the inlet chamber 142 to the outlet chamber 144.

A pin 152 extends upwardly from the section of the base forming, in part, the inlet chamber 142. When the water tank 120 is mounted on the base 70, the pin 152 protrudes into the tank cap 134 to push the radial flange 336 on the pin 334 upwardly, causing the sealing skirt 338 to break contact with the upper surface of the upper cylindrical wall 320 to open the tank cap 134, thereby allowing water to pass under gravity into the inlet chamber 142. As the inlet chamber 142 fills with water, water passes through the channel 150 to enter the outlet chamber 144. As water is output from the water tank 120, it is replaced within the water tank 120 by air. The air enters the tank cap 134 through slots 154 located in the side wall of the tank cap 134 and passes through into the water tank 120 via the apertures 332a, 332b. As the chambers 142, 144 fill with water, the level of water within the chambers 142, 144 equalizes. The tank cap 134 is arranged so that the water reservoir 140 can be filled with water to a maximum level which is substantially co-planar with the upper end of the slots 154 located within the side wall of the tank cap 134; above that level no air can enter the water tank 120 to replace water output from the water tank 120.

The section of the base forming, in part, the outlet chamber 144 comprises a circular aperture for exposing a piezoelectric transducer 156. The drive circuit 74 is configured to actuate vibration of the transducer 156 in an atomization mode to atomise water located in the outlet chamber 144. In the atomization mode, the transducer 156 may vibrate ultrasonically at a frequency f1, which may be in the range from 1 to 2 MHz.

The water reservoir 140 also includes an ultraviolet radiation (UV) generator for irradiating water within the water reservoir 140. In this embodiment, the UV generator is arranged to irradiate water within the outlet chamber 144 of the water reservoir 140. In this embodiment, the UV generator comprises a UV lamp 160, which forms part of a UV lamp assembly 162 of the base 70. The UV lamp assembly 162 is in the form of a cartridge which is removably insertable into the base 70 to allow the UV lamp assembly 162 to be replaced by a user as required. The water reservoir 140 comprises a UV transparent tube 164. The tube 164 is located within the outlet chamber 144 of the water reservoir 140. The UV lamp assembly 162 is supported by the base 70 so that the UV lamp 160 is located within the tube 164 when it is inserted fully into the base 70. Preferably, an open end of the tube 164 protrudes through an aperture formed in the side wall of the water reservoir 140 to allow the UV lamp 160 to enter the tube 164. An O-ring sealing member may be provided between the tube 164 and the aperture formed in the side wall to inhibit water leakage through the aperture.

The water tank 120 defines an inlet duct 174 for receiving the second air flow from the outlet port 114 of the base 70. The water tank 120 also includes an outlet duct for conveying the second air flow from the reservoir 140 to the second air inlet 58 of the nozzle 14.

With reference to FIGS. 4(a) and 8(a), the water tank 120 comprises a seal 210 for engaging the base 56 of the nozzle 14. In FIG. 8(a), the seal 210 is illustrated as being detached from the remainder of the water tank 120 to allow features of the seal 210 to be seen. The seal 210 is supported by a support 212 which is integral with the inner wall 124 of the water tank 120. The seal 210 is detachably connected to the support 212 to allow a user to remove the seal for cleaning and replacement.

As illustrated in FIG. 4, when the water tank 120 is mounted on the base 70 the inner wall 124 surrounds the upper wall of the base 70 to expose the open upper end of the upper cylindrical section of the upper wall. The water tank 120 includes a handle 230 to facilitate removal of the water tank 120 from the base 70. The handle 230 is pivotably connected to the water tank 120 so as to be moveable relative to the water tank 120 between a stowed position, in which the handle 230 is housed within a recessed section 232 of the water tank 120, and a deployed position, in which the handle 230 is raised above the upper wall 126 of the water tank 120 so that it may be gripped by a user.

When the nozzle 14 is mounted on the body 12, the base 26 of the outer casing section 22 of the nozzle 14 is located over the open end of the upper cylindrical section of the upper wall of the base 70, and the base 56 of the front casing section 50 of the nozzle 14 is located over the seal 210 of the water tank 120. The user then pushes the nozzle 14 towards the body 12. When the bases 26, 56 of the nozzle 14 are fully inserted in the body 12, the annular seal 109b engages the end of the base 26 of the nozzle 14 to form an air tight seal between the nozzle 14 and the base 70, whereas the seal 210 engages the end of the base 56 of the nozzle 14 to form an air tight seal between the nozzle 14 and the water tank 120.

To operate the humidifying apparatus 10, the user actuates the first button of the remote control, in response to which the remote control 300 generates a signal containing data indicative of the actuation of this first button. This signal is received by the receiver 304 of the user interface circuit 302. The operation of the button is communicated by the user interface circuit 302 to the drive circuit 74, in response to which the drive circuit 74 actuates the UV lamp 160 to irradiate water stored in the outlet chamber 144 of the water reservoir 140. In this example, the drive circuit 74 simultaneously activates the motor 92 to rotate the impeller 90. The rotation of the impeller 90 causes air to be drawn into the body 12 through the air inlet 72. An air flow passes through the impeller housing 104 and the guide vanes 100. Downstream from the guide vanes 100, a portion of the air emitted from the guide vanes 100 enters the duct 110, whereas the remainder of the air emitted from the guide vanes 100 is conveyed along the first air passageway 76 to the first air inlet 28 of the nozzle 14. The impeller 90 and the motor 92 may thus be considered to generate a first air flow which is conveyed to the nozzle 14 by the first air passageway 76 and which enters the nozzle 14 through the first air inlet 28.

The first air flow enters the first interior passage 46 at the lower end thereof. The first air flow is divided into two air streams which pass in opposite directions around the bore 20 of the nozzle 14. As the air streams pass through the first interior passage 46, air enters the mouth 48 of the nozzle 14. The air flow rate into the mouth 48 is preferably substantially even about the bore 20 of the nozzle 14. The mouth 48 guides the air flow towards the first air outlet 30 of the nozzle 14, from where it is emitted from the humidifying apparatus 10.

The air flow emitted from the first air outlet 30 causes a secondary air flow to be generated by the entrainment of air from the external environment, specifically from the region around the first air outlet 30 and from around the rear of the nozzle 14. Some of this secondary air flow passes through the bore 20 of the nozzle 14, whereas the remainder of the secondary air flow becomes entrained, in front of the nozzle 14, within the air flow emitted from the first air outlet 30.

As mentioned above, with rotation of the impeller 90 air enters the second air passageway 78 to form a second air flow. The second air flow passes through the duct 110 and the inlet duct 174 of the water tank 120 to be emitted over the water stored in the outlet chamber 144 of the water reservoir 140. When the drive circuit 74 actuates the vibration of the transducer 156 to atomize water stored in the outlet chamber 144 of the water reservoir 140, airborne water droplets above the water located within the outlet chamber 144 of the water reservoir 140. The transducer 156 may be actuated in response to a user input received from the remote control 300, and/or a fixed time period following the actuation of the motor 92 to create the air flows through the humidifying apparatus 10.

With rotation of the impeller 90, airborne water droplets become entrained within the second air flow. The—now moist—second air flow passes upwardly through the outlet duct to the second air inlet 58 of the nozzle 14, and enters the second interior passage 68 within the front section 18 of the nozzle 14.

At the base of the second interior passage 68, the second air flow is divided into two air streams which pass in opposite directions around the bore 20 of the nozzle 14. As the air streams pass through the second interior passage 68, each air stream is emitted from the second air outlet 60. The emitted second air flow is conveyed away from the humidifying apparatus 10 within the air flow generated through the emission of the first air flow from the nozzle 14, thereby enabling a humid air current to be experienced rapidly at a distance of several meters from the humidifying apparatus 10.

The invention claimed is:

1. A humidifying apparatus comprising:
a base comprising a chamber;
a water tank removably mounted on the base for supplying water to the chamber;
an impeller and a motor for driving the impeller to generate an air flow;
an inlet duct for conveying the air flow to the chamber;
a humidifier for humidifying the air flow with water from the chamber; and
an outlet duct for conveying the humidified air flow from the chamber;
wherein the water tank is annular in shape, and comprises an annular inner wall linked to an annular outer wall by a lower internal surface of the water tank;
wherein the lower internal surface of the water tank comprises an arcuate raised portion, which extends around a major portion of the water tank, and an arcuate feeder trough at one end of the arcuate raised portion, which is lower than the arcuate raised portion when the water tank is mounted on the base, and wherein an outlet of the water tank and a water level detection device are located in the arcuate feeder trough.

2. The humidifying apparatus of claim 1, further comprising an ultraviolet radiation generator for irradiating water stored in the chamber.

3. The humidifying apparatus of claim 1, wherein the water tank at least partially surrounds the impeller and motor.

4. The humidifying apparatus of claim 1, wherein a downwardly sloping wall connects the raised portion to the feeder trough.

5. The humidifying apparatus of claim 1, wherein the feeder trough has a capacity of 150 ml or less.

6. The humidifying apparatus of claim 5, wherein the feeder trough has a capacity of 100 ml or less.

7. The humidifying apparatus of claim 6, wherein the feeder trough has a capacity of 60 ml or less.

8. The humidifying apparatus of claim 1, wherein an external base surface of the water tank comprises a recessed portion corresponding to the raised portion.

9. The humidifying apparatus of claim 8, wherein the recessed portion defines an overflow chamber for receiving water from the chamber when the water tank is mounted on the base.

* * * * *